United States Patent
Files et al.

(10) Patent No.: US 11,314,353 B1
(45) Date of Patent: Apr. 26, 2022

(54) SYSTEM AND METHOD FOR TRANSFER OF CLIPBOARD DATA BETWEEN DISPLAY SCREENS

(71) Applicant: DELL PRODUCTS, LP, Round Rock, TX (US)

(72) Inventors: Jace W. Files, Round Rock, TX (US); James D. Trim, Pflugerville, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/152,396

(22) Filed: Jan. 19, 2021

(51) Int. Cl.
*G06F 3/041* (2006.01)
*G06F 3/0354* (2013.01)
*H04L 9/08* (2006.01)
*H04W 4/80* (2018.01)

(52) U.S. Cl.
CPC ...... *G06F 3/04162* (2019.05); *G06F 3/03545* (2013.01); *H04L 9/0819* (2013.01); *H04L 9/0866* (2013.01); *H04W 4/80* (2018.02)

(58) Field of Classification Search
CPC ............ G06F 3/04162; G06F 3/03545; H04L 9/0819
See application file for complete search history.

(56) References Cited

U.S. PATENT DOCUMENTS

| | | | |
|---|---|---|---|
| 9,436,335 B1 * | 9/2016 | Scherer | G06F 3/023 |
| 10,642,317 B2 | 5/2020 | Trim et al. | |
| 10,817,079 B2 | 10/2020 | Ligameri et al. | |
| 2017/0068339 A1 * | 3/2017 | Zimmerman | G06F 3/0416 |
| 2018/0254018 A1 * | 9/2018 | Cherkashin | G06F 21/34 |
| 2019/0163432 A1 | 5/2019 | Files et al. | |
| 2019/0164520 A1 | 5/2019 | Trim et al. | |
| 2020/0064937 A1 * | 2/2020 | Wassvik | G06F 3/04186 |

* cited by examiner

*Primary Examiner* — Albert K Wong
(74) *Attorney, Agent, or Firm* — Larson Newman, LLP

(57) ABSTRACT

An information handling system includes a first display device having a touch-sensitive surface capable of detecting a stylus. The stylus may communicate with the first display device via the touch-sensitive surface. A processor copies content from the touch-sensitive surface to a first memory of the first display device, and stores an identifier key and a public key that are both associated with the first display device to a second memory. The processor may also establish a secure communication link between the first display device and a second display device using the identifier key and the public key, and paste the content from the first memory to the second display device using the stylus.

20 Claims, 4 Drawing Sheets

SYSTEM AND METHOD FOR TRANSFER OF CLIPBOARD DATA BETWEEN DISPLAY SCREENS

FIELD OF THE DISCLOSURE

The present disclosure generally relates to information handling systems and more particularly relates to the transfer of clipboard data between display screens.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a first display device having a touch-sensitive surface capable of detecting a stylus. The stylus may communicate with the first display device via the touch-sensitive surface. A processor copies content from the touch-sensitive surface to a first memory of the first display device, and stores an identifier key and a public key that are both associated with the first display device to a second memory. The processor may also establish a secure communication link between the first display device and a second display device using the identifier key and the public key, and paste the content from the first memory to the second display device using the stylus.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
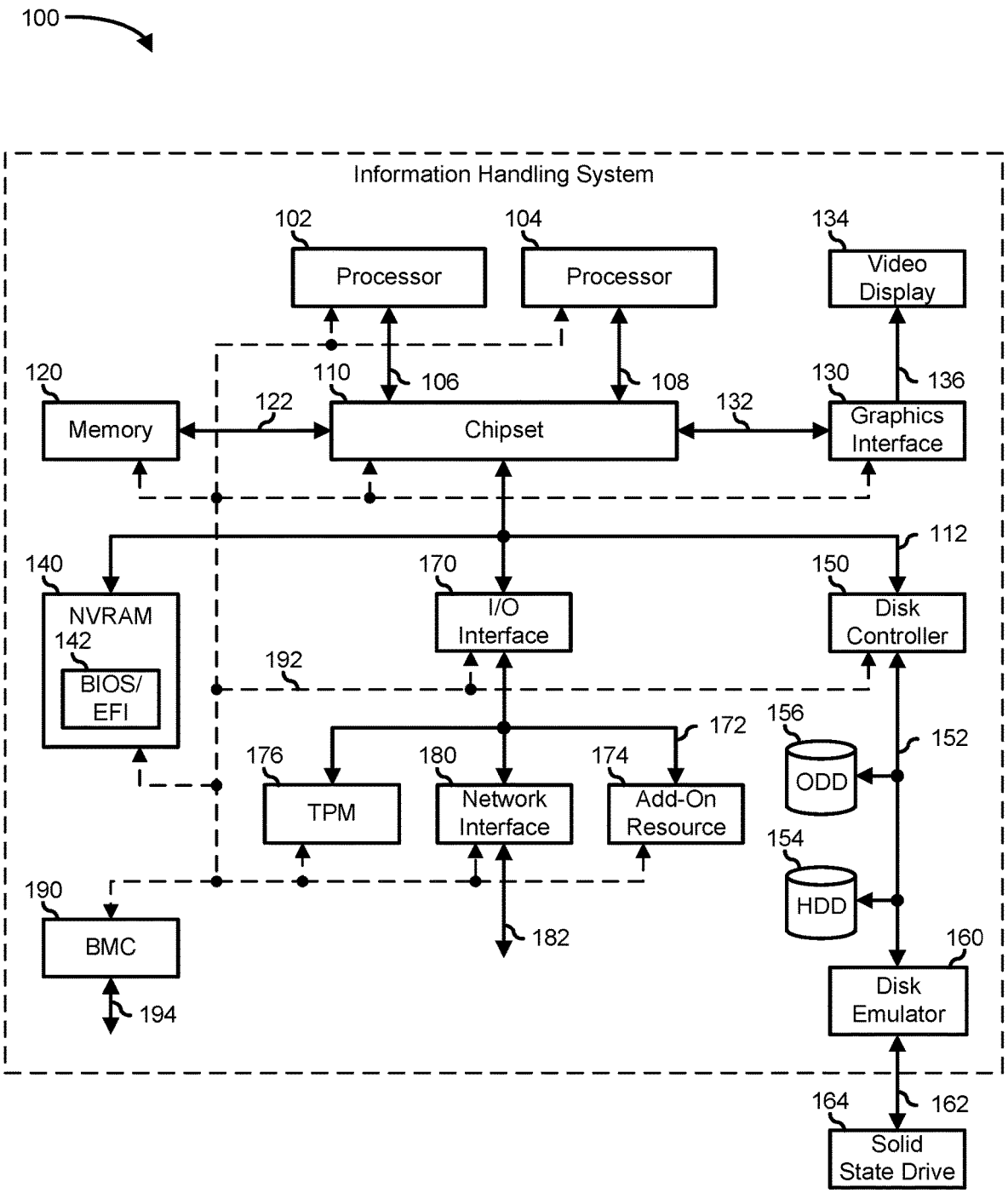
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Pressure sensitive electronic display devices, also referred to as touch screens, are commonly used in viewing or managing content with the help of a stylus. In this regard, being able to transfer data between the screens on a dual-screen electric device or between screens of different electronic devices is desirable for a user to view or manage content. For example, the user may want to easily transfer data from a smart cellular telephone to her portable computer for further processing. To facilitate this and other advantages, the present disclosure provides systems and methods to cut or copy the content to a clipboard and transfer the clipboard data between display screens.

Figure 2:
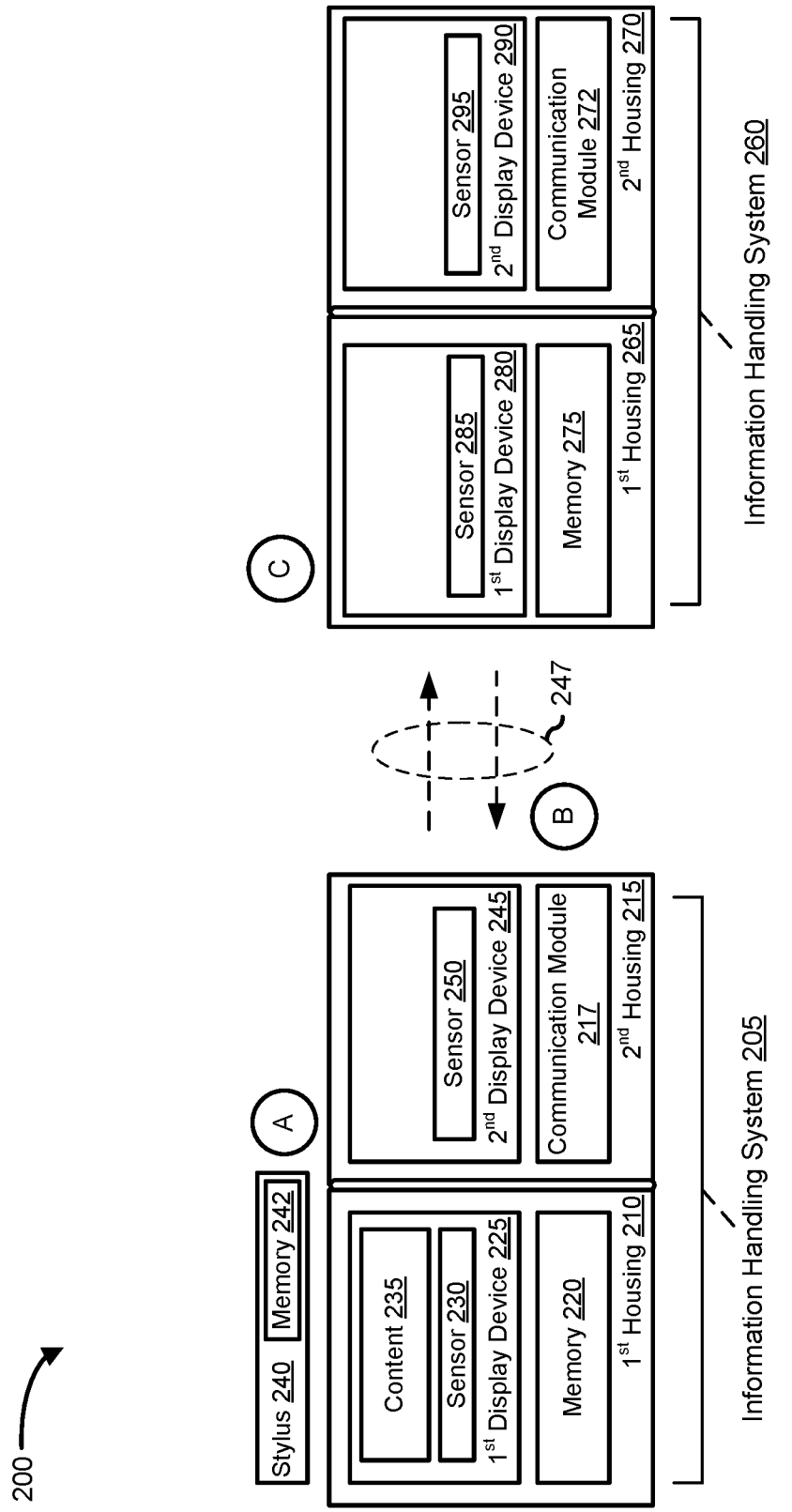
FIG. 2 is a block diagram illustrating a system for transfer of clipboard data between display screens, according to an embodiment of the present disclosure.

FIG. 2 illustrates a system 200 to transfer clipboard data between display devices that may be implemented is depicted. The clipboard data may be transferred between display screens of the same device or different devices. System 200 includes an information handling system 205, an information handling system 260, and a stylus 240. Information handling system 205 and information handling system 260 are similar to information handling system 100 of FIG. 1. Stylus 240 incudes a memory 242. Information handling system 205 includes a first housing 210 and a second housing 215. First housing 210 includes a memory 220 and a first display device 225. First display device 225 includes a content 235 and a sensor 230. Second housing 215 includes a communication module 217 and a second display device 245 which includes a sensor 250. Information handling system 260 includes a first housing 265 and a second housing 270. First housing 265 includes a memory 275 and a first display device 280 which includes a sensor 285. Second housing 270 includes a communication module 272 and a second display device 290 and a sensor 295.

As illustrated information handling system 205 includes a first housing 210 and a second housing 215. Information handling system 205 may be an e-book reader, a mobile cell phone, a laptop, a notebook, a tablet, a desktop, or any other touch-sensitive computing device. Information handling system 205 may include software that enables a user to use it with stylus 240 in a manner similar to a pad of paper or paper-based notebook and in-based pen or graphite-based pencil.

While information handling system 205 is shown with two housings, in other implementations, information handling system 205 may include a single housing such as a tablet form factor. In yet another implementation, information handling system 205 may include more than two housings. Information handling system 205 may be a laptop or other information handling system with a touch screen display. Information handling system 260 and its components may be configured similar to information handling system 205. For example, communication module 272 may be similar to communication module 217. In addition, first display device 280 and second display device 290 may be similar to first display device 225 and second display device 245. Also, first housing 265 and second housing 270 may be similar to first housing 210 and second housing 215.

In some cases, a data cable may run through a hinge between the housings to connect components in first housing 210 with the components in second housing 215. In other cases, communication module 217 may provide a wireless communication channel between the first housing 210 and second housing 215. For example, a first wireless transceiver in first housing 210 and in second housing 215 may provide wireless communications between the two housings.

Communication module 217 may be configured to allow for connection to a nearby electronic device so that data can be downloaded to the stylus from the display device, pasted from the stylus or onto the device, or optionally deleted from the stylus. For example, connection modules may include an advanced encryption standard (AES), NFC, radio-frequency identification (RFID), Bluetooth, Wi-Fi, electromagnetic, infrared, or other communication technologies. Communication module 217 may also be a wireless transceiver, wireless interface, or similar to network interface 180 of FIG. 1. Although communication module 217 is shown included in second housing 215, in other embodiments, first housing 210 may also include a communication module similar to communication module 217.

Communication link 247 may illustrate a wireless communication between information handling system 205 and information handling system 260 via communication module 217 and communication module 272 respectively which may be used to transfer content 235 between the information handling systems. Communication link 247 may include an AES, NFC, Bluetooth, 802.11 b/g/n wireless local area network (WLAN), or other suitable communication links that allow for the transfer of data between one or more display devices and stylus 240.

Sensor 230 may be configured with stylus detection technology to detect stylus 240 and/or stylus input. For example, first display device 225 may be layered with a capacitive input sensor grid for passive touch-based input, such as with a finger or passive stylus. Numerous touch screen display configurations can be implemented using any number of known or proprietary screen-based input detecting technologies. Sensor 250, sensor 285, and sensor 295 may be similar to sensor 230.

Stylus 240 may be a touch-input device such as a pen that is used to provide input on a touch-sensitive display. For example, stylus 240 may enable a user to write directly unto a touchscreen display device of a computing device such as a smartphone, tablet computer, or laptop computer. Stylus 240 may also be used to copy or cut content 235 from a display screen of an information handling by manipulating stylus 240 or its control features. Stylus 240 may also be used to paste content 235 to the same or a different display screen, wherein the display screen is with the same or a different information handling system. Stylus 240 may be implemented with a number of stylus technologies such as a DouSense® pen by N-Trig® or electromagnetic resonance-based pens by Wacom technology or any other commercially available or proprietary stylus technology. Stylus 240 may include a near field communication technology, such as, for example, Bluetooth that enables the stylus to be associated, such as paired, with a particular computing device. Stylus 240 may also include a processor to provide local intelligence and a memory such as memory 242 for storage.

Stylus 240 may be configured to select content 235 which may include data such as text, imagery, files, or other media from first display device 225 and copy it to a clipboard such as memory 220, a portion of memory 220, or other temporary storage on information handling system 205. The cut, copy, and/or paste of content may be in response to a stylus action or via a control feature such as a button in stylus 240. In one embodiment, content 235 may not be copied to stylus 240. Instead, stylus 240 may be configured to store connection data which includes an identifier key, internet protocol address, and public key in memory 242 that may be used to identify, authenticate, and/or find the owner of the content to be pasted. The public key may be a transport layer security (TLS) public key. Based on the stored connection data, stylus 240 may be used to create a secure communication link between display devices or information handling systems, such as communication link 247. For example, the connection data may be used to find information handling system 205 and/or first display device 225 when sharing content 235 to another display device, such as second display device 245. The connection data may also be used to find information handling system 205 and/or first display device 225 when sharing content 235 to another device such as first display device 280 of information handling system 260. The identifier key may include the location of the copied data, device name, media access control (MAC) address, or similar information.

When stylus 240 is detected by the second display device, such as during a hover mode on the screen of the second display device, a preview of the first display device's clipboard data is ghosted onto the screen of the second display device. When the stylus is placed into "paste" mode via a button action and linked via Bluetooth to the second display device, a secure transport layer security link or other security protocol may be established between the first display device and the second display device, such as NFC, radio frequency identification (RFID), etc. When the content is in the user's desired position, a tap on the screen by the stylus will paste the content into the previewed location on the screen of the second display device. If content 235 is desired to be cut and paste from a primary screen to a secondary screen on a dual-screen device then the transport layer security link is not necessary. The application in the secondary screen can retrieve the clipboard data directly from the primary screen.

FIG. 2 is annotated with a series of letters A-C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, content 235 is copied to memory 220 of first display device 225. At stage B, communication link 247 is established between information handling system 205 and information handling system 260. Prior to establishing communication link 247, a connection based on AES protocol may be established between information handling system 205 and information handling system 260. In particular, the AES communication channel may be established between the stylus and a touch controller of the information handling system by shift-keying the receive (Rx) and transmit (Tx) lines on the sensors embedded in the display device. The touch controller may be configured to track the change between each couple of Rx and Tx lines and detects the touch event. The Rx\Tx line may mark the user's desired location for pasting the content.

The AES communication channel is a low-speed communication channel, typically 1.5 MHz downlink and 400 kHz uplink, which may be used to transfer the connection data stored in memory 242 to establish communication link 247 which may be a backend connection between information handling system 205 and information handling system 260. The connection data includes data used in establishing communication link 247, such as the identifier key, internet protocol address, public key, etc. In particular, the public key may be used to authenticate the first display device when establishing communication link 247. The connection information may also be used to locate content 235 in first display device 225. For example, the connection information may be used to locate memory 220. In an additional embodiment, a Bluetooth wireless link could also provide this communication path.

The establishment of the secure connection may be performed using a handshake protocol such as a TLS handshake protocol. In particular, the establishment of the secure connection between information handling system 205 and information handling system 260 may include information handling system 260 receiving the public key and internet protocol address of information handling system 205 from memory 242. Information handling system 260 would send an encrypted request using the public key of information handling system 205 which would include a certificate of information handling system 260. Information handling system 205 would receipt the encrypted request from information handling system 260 and decrypt it. Information handling system 205 would then initiate a key exchange to be used for the data transfer with information handling system 260. For example, information handling system 205 would initiate a Rivest-Shamir-Adleman (RSA) or Diffie-Hellman key exchange. Information handling system 260 processes one or more parameters associated with the key exchange verifies the MAC address and returns an encrypted "Finished" message to information handling system 205. At this point, an application in information handling system 260 can take over and use the encrypted connection to transfer data from information handling system 205.

At stage C, after communication link 247 is established, information handling system 260 may have the ability to access the memory 220 of information handling system 205 which allows the information handling system 260 to copy and paste data such as content 235 from memory 220 to information handling system 260. In particular, the data copied to the clipboard may be transmitted to the other display device using communication link 247. In one embodiment, content 235 may be pasted to memory 275, which is similar to memory 220. Upon paste of content 235, the same may be deleted from memory 220. Content 235 may be previewed when stylus 240 is hovering over a secondary display device such as second display device 245 prior to a commit. Content 235 may also be previewed when stylus 240 is hovering over another display device of another information handling system, such as first display device 280 or second display device 290 prior to a commit. The commit or paste may be performed when stylus 240 touches the surface of the secondary display device or the other display device. Upon preview, if content 235 is not the desired content to be copied, instead of touching the surface of the secondary display device or the other display device, stylus 240 is moved away such as back to the first display device. A communication link may also be established between first display device 225 and second display device 245 that allows second display device 245 to copy and paste data from first display device 225 and a second display device such as second display device 245.

Figure 3:
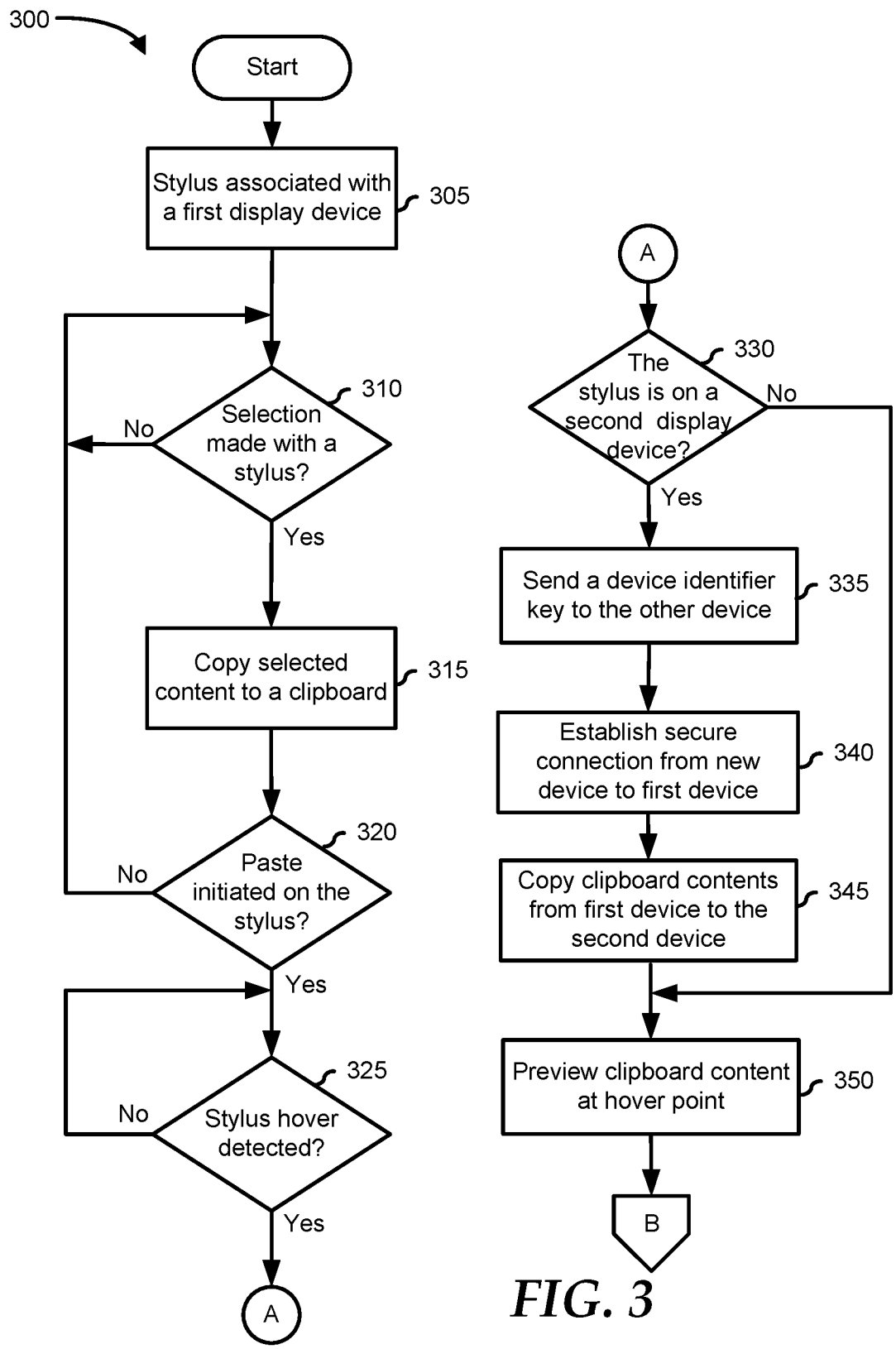
FIG. 3 and FIG. 4 are flowcharts illustrating a method for transfer of clipboard data between display screens, according to an embodiment of the present disclosure.

FIG. 3 illustrates a method 300 for the transfer of clipboard data between display screens. Method 300 may be performed by one or more components of system 200 of FIG. 2. While embodiments of the present disclosure are described in terms of system 200 FIG. 2, it should be recognized that other systems may be utilized to perform the described method. One of skill in the art will appreciate that this flowchart explains a typical example, which can be extended to advanced applications or services in practice.

Method 300 typically starts at block 305 where a stylus is detected on a first display device. The first display device may include a pressure-sensitive surface such as a touch-sensitive surface that is capable of receiving input via pressure applied by the stylus to the surface of the first display device. A stylus may be used to copy and paste between two screens on a dual-screen device. The stylus may also be used to copy and paste between two display devices such as between a screen of an information handling system and a second screen in a second information handling system using a secure link. The information handling systems may have touch-sensitive screens that allow input from the stylus. For example, the stylus may be used to copy and paste between a laptop and a tablet or vice versa. The method proceeds to decision block 310.

At decision block 310, the method determines whether a selection of content in the display device has been made using the stylus. The content may be selected by a gesture of the user performed with the stylus. If a selection has been made using the stylus, then the "YES" branch is taken and the method proceeds to block 315. If a selection has not been made with the stylus, then the "NO" branch is taken and the method loops back to decision block 310 to continue monitoring for a content selection using the stylus.

At block 315, the selected content may be copied or cut to a clipboard of the first display device. For example, a file, a string of plain text, image data, audio data, multimedia data, or any other data type may be placed in the local clipboard of the first display device. The method proceeds to decision block 320. At decision block 320, the method determines whether a paste action is initiated on the stylus. If the paste action is initiated, then the "YES" branch is taken and the method proceeds to decision block 325. If the paste action is not initiated, then the "NO" branch is taken and the method proceeds to decision block 310.

At decision block 325, the method determines whether the stylus is detected hovering some distance from the screen of the first display device. For example, the stylus may be detected hovering several centimeters above the screen by a sensing technology deployed in the touch-sensitive display screen of the first display device. The first display device may determine a distance between the tip of the stylus and the surface of the display device. For example, the distance may be determined using a stylus sensor, electromagnetic resonance, Bluetooth, or another type of technology.

If the stylus is detected hovering above the screen of the first display device, then the "YES" branch is taken and the method proceeds to decision block 330. If the stylus is not detected hovering above the screen of the first display device, then the "NO" branch is taken and the method loops back to decision block 325. At decision block 330, the method determines whether the stylus is on a second display device. Similar to the first display device, the second display device may include a touch input sensor that is capable of receiving input via pressure applied by the stylus to the screen or surface of the second display device. The first display device and the second display device may be configured to behave as independent display devices or the second display device may be configured as an extension of the first display device or vice versa. If the stylus is on the second display device, then the "YES" branch is taken and the method proceeds to block 335. If the stylus is not determined to be on the second display device, then the "NO" branch is taken and the method proceeds to block 350.

At block 335, the method sends a device identifier key of the first display device to the second display device as part of the key exchange. The method proceeds to block 340 where it establishes a secure connection between the first display device and the second display device. Before the first display device and the second display device can begin exchanging data over a secure communication channel, the secure communication channel is negotiated which includes the first display device and the second display device agreeing on a protocol version, choosing a cipher suite, and verifying certificates. Subsequent to establishing the secure connection, the method copies the contents of the clipboard from the first display device to the second display device in block 345. In one embodiment, the method may copy the contents to the clipboard of the second display device.

At block 350, the method previews the clipboard content at a point where the stylus was hovering, also referred to as a hover point, on the display of the device. The hover point may be based on the location of the stylus tip and the angle of the stylus, a location to which the stylus is pointing can be determined. The method may preview the clipboard content at an application of the device. An algorithm may use the virtual light source (VLS) along with the direction, location including height from the surface of the display device, and the angle of the stylus to display the previewed data. The method proceeds to decision block 405 at FIG. 4.

Figure 4:
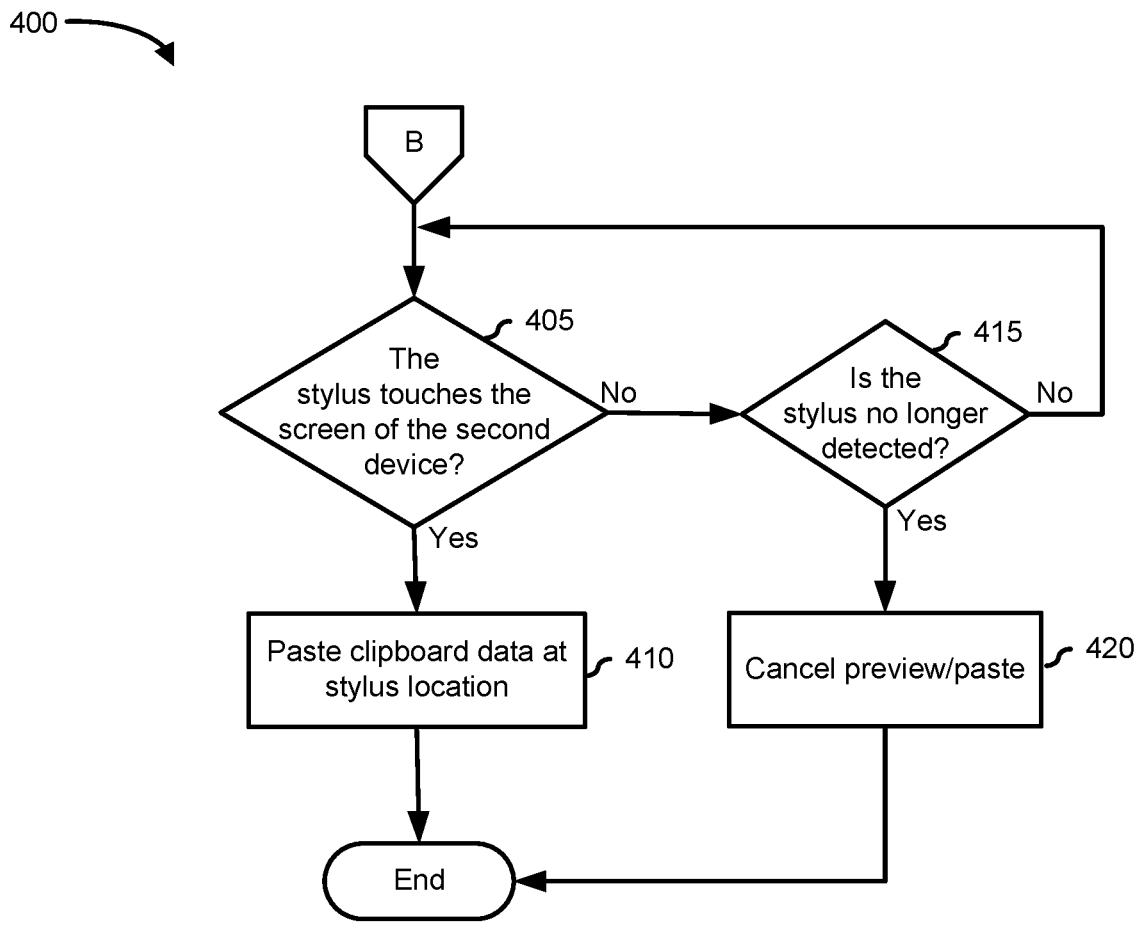

FIG. 4 illustrates a method 400 for the transfer of clipboard data between display screens. Method 400 is a continuation of method 300 of FIG. 3. While embodiments of the present disclosure are described in terms of system 200 FIG. 2, it should be recognized that other systems may be utilized to perform the described method. One of skill in the art will appreciate that this flowchart explains a typical example, which can be extended to advanced applications or services in practice.

At decision block 405, the method determines whether the stylus touches the display screen of the second display device. If the stylus touches the display screen of the second display device, then the "YES" branch is taken and the method proceeds to block 410. If the stylus does not touch the display screen of the second display device, then the "NO" branch is taken and the method proceeds to decision block 415.

At decision block 415, the method determines whether the stylus is no longer detected. If the stylus is no longer detected, then the "YES" branch is taken, and then the method proceeds to block 420. If the stylus is still detected, then the "NO" branch is taken and the method proceeds to decision block 405. At block 410, the method pastes the contents of the clipboard at the location of the stylus. In particular, the method pastes the content of the clipboard at the point the stylus touches the display screen of the second display device. At block 420, the method cancels the preview and/or paste of the clipboard content. The method ends subsequent to block 410 and block 420.

Although FIG. 3 show example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 335 and block 340 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
copying, by a hardware processor, content from a first display device to a first memory of the first display device using a stylus;
storing an identifier key and a public key associated with the first display device to a second memory associated with the stylus;
establishing a secure communication link between the first display device and a second display device using the identifier key and the public key; and
pasting the content from the first memory of the first display device to the second display device with the stylus, wherein the content is transferred from the first display device via the secure communication link.

2. The method of claim 1, wherein the first memory is a clipboard.

3. The method of claim 1, wherein the identifier key is used to identify the first display device.

4. The method of claim 1, wherein the identifier key includes a device name of the first display device.

5. The method of claim 1, wherein the pasting of the content is performed at a user's desired location on the second display device.

6. The method of claim 1, further comprising copying an internet protocol address to the second memory.

7. The method of claim 1, further comprising, prior to the establishing the secure communication link, using an advanced encryption standard protocol in transmitting the identifier key to the second display device.

8. The method of claim 1, wherein the secure communication link is Bluetooth wireless communication channel.

9. The method of claim 1, previewing the content when the stylus is hovering above the second display device.

10. The method of claim 1, performing a commit when the stylus touches a display screen of the second display device.

11. The method of claim 1, wherein the secure communication link allows the second display device to access the first memory of the first display device.

12. An information handling system, comprising:
a first display device having a touch-sensitive surface capable of detecting a stylus, wherein the first display device includes a first memory;
the stylus configured to communicate with the first display device via the touch-sensitive surface, wherein the stylus includes a second memory; and
a processor configured to:
copy content from the touch-sensitive surface to the first memory of the first display device;
store an identifier key and a public key that are both associated with the first display device to the second memory;
establish a secure communication link between the first display device and a second display device using the identifier key and the public key; and
paste the content from the first memory to the second display device using the stylus, wherein the content is transmitted via the secure communication link.

13. The information handling system of claim 12, wherein the first memory is a clipboard.

14. The information handling system of claim 12, wherein the identifier key is used to identify the first display device.

15. The information handling system of claim 12, wherein the identifier key includes a device name of the first display device.

16. The information handling system of claim 12, wherein the paste of the content is performed at a user's desired location on a touch screen of the second display device.

17. A non-transitory computer-readable medium including code that when executed performs a method, the method comprising:
copying content from a touch screen of a first display device to a first memory of the first display device using a stylus;
storing an identifier key and a public key associated with the first display device to a second memory associated with the stylus;
establishing a secure communication link between the first display device and a second display device using the identifier key and the public key stored in the second memory; and
pasting the content from the first memory of the first display device to the second display device with the stylus, wherein the content is transmitted via the secure communication link.

18. The non-transitory computer-readable medium of claim 17, further comprising, prior to the establishing the secure communication link, using advanced encryption standard protocol in transmitting the identifier key to the second display device.

19. The non-transitory computer-readable medium of claim 17, wherein the secure communication link allows the second display device to access the first memory of the first display device.

20. The non-transitory computer-readable medium of claim 17, further comprising previewing the content when the stylus is hovering above a display screen of the second display device.

* * * * *